(12) United States Patent
Raman et al.

(10) Patent No.: US 9,292,446 B2
(45) Date of Patent: Mar. 22, 2016

(54) SPECULATIVE PREFETCHING OF REMOTE DATA

(71) Applicant: International Business Machines Corporation, Armonk, NY (US)

(72) Inventors: Arun Raman, Santa Clara, CA (US); Martin Vechev, Zurich (CH); Mark N. Wegman, Ossining, NY (US); Eran Yahav, Haifa (IL); Greta Yorsh, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 13/645,032

(22) Filed: Oct. 4, 2012

(65) Prior Publication Data

US 2014/0101278 A1    Apr. 10, 2014

(51) Int. Cl.
*G06F 15/167*       (2006.01)
*G06F 12/08*        (2006.01)
*G06F 9/52*         (2006.01)

(52) U.S. Cl.
CPC ............ *G06F 12/0862* (2013.01); *G06F 9/528* (2013.01); *G06F 2212/6026* (2013.01)

(58) Field of Classification Search
CPC .................... G06F 12/0862; G06F 2212/6026; G06F 9/528
USPC ........................ 709/213; 711/137, 154, 158
See application file for complete search history.

(56) References Cited

U.S. PATENT DOCUMENTS 7,937,532 B2 *  5/2011  Kunze .................. G06F 9/3828
                                                711/130
2003/0145314 A1 *  7/2003  Nguyen et al. ................. 717/158
2004/0024863 A1 *  2/2004  Connor et al. ................. 709/224
2007/0088915 A1 *  4/2007  Archambault et al. ........ 711/137
2008/0046657 A1 *  2/2008  Eichenberger ...... G06F 12/0862
                                                711/137
2008/0256524 A1 * 10/2008  Saraswati ...................... 717/158
2009/0328047 A1 * 12/2009  Li et al. .......................... 718/102
2014/0089383 A1 *  3/2014  Hong et al. ..................... 709/203
2014/0258643 A1 *  9/2014  Ganapathi et al. ............. 711/147

OTHER PUBLICATIONS

Chang, Fay W., "Using speculative execution to automatically hide I/O latency", School of Computer Science, Carnegie Mellon University, Dec. 7, 2001.*
Raman, A., et al., "Prefetching of Remote Data", Proceedings of the 26th Annual ACM SIGPLAN Conference on Object-Oriented Programming, Systems, Languages, and Applications (OOPSLA), Oct. 22-27, 2011, pp. 259-274.

* cited by examiner

*Primary Examiner* — Oanh Duong
(74) *Attorney, Agent, or Firm* — Scully, Scott, Murphy & Presser, P.C.; Louis J. Percello, Esq.

(57) ABSTRACT

A profiler may identify potentially-independent remote data accesses in a program. A remote data access is independent if value returned from said remote data access is not computed from another value returned from another remote data access appearing logically earlier in the program. A program rewriter may generate a program-specific prefetcher that preserves the behavior of the program, based on profiling information including the potentially-independent remote data accesses identified by the profiler. An execution engine may execute the prefetcher and the program concurrently. The execution engine may automatically decide which of said potentially-independent remote data accesses should be executed in parallel speculatively. A shared memory shared by the program and the prefetcher stores returned data from a data source as a result of issuing the remote data accesses.

25 Claims, 4 Drawing Sheets

SPECULATIVE PREFETCHING OF REMOTE DATA

FIELD

The present application relates generally to computers, computer architecture and programming development and analysis, and more particularly to addressing performance latency in programs that access remote data such as remote databases and web services.

BACKGROUND

Web, business, and scientific programs have increasingly become data bound. Many modern programs use remote data sources, such as remote databases and web services, and spend a significant amount of their running time waiting for remote data to be fetched. They issue large numbers of long latency data access requests—long latency because the data is often served by remote web services or databases. Owing to the disparity between central processing unit (CPU) speeds and network latencies and bandwidths, these programs spend a significant fraction of their execution time waiting for the data access requests to be serviced.

To improve the performance of such programs, programmers expend a lot of time and effort scheduling the requests in a way that minimizes the overall execution time using schemes such as batching and parallelization. Batching refers to converting several round trips into one, and thereby amortizing the round trip cost over more data. Related remote data access calls are not performed at the point the client requests them, but are instead deferred until the client actually needs the value of a result. By that time, a number of deferred calls may have accumulated and the calls are sent all at once, in a "batch". Parallelization exposes independent remote data accesses and overlaps their round trip latencies. In both mechanisms, it usually requires significant code rewriting, thereby obscuring the functional logic of the program, and often results in non-portable performance gains. Ideally, the programmer should only be concerned with expressing the functional logic of the program, and allow the compiler and runtime to orchestrate the remote data requests efficiently.

A conventional way to overcome the problem of data access latency is data prefetching (See, e.g., K. S. Trivedi. *On the paging performance of array algorithms*. IEEE Trans. Comput., 26(10):938-947, 1977; T. C. Mowry, A. K. Demke, and O. Krieger. *Automatic compiler-inserted I/O prefetching for out-of-core applications*. In OSDI, 1996]. The idea is to issue asynchronous data requests before the data is really needed so that the data may be available locally when accessed by the program. Prefetching has been studied in the microarchitecture community to hide the latency between the processing core and the memory subsystem (See, e.g., W. Zhang, D. M. Tullsen, and B. Calder. *Accelerating and adapting precomputation threads for efficient prefetching*. In HPCA, 2007; D. Kim and D. Yeung. *Design and evaluation of compiler algorithms for pre-execution*. In ASPLOS, 2002; J. D. Collins, D. M. Tullsen, H. Wang, and J. P. Shen. *Dynamic speculative precomputation*. In MICRO, 2001; C.-K. Luk. *Tolerating memory latency through software-controlled pre-execution in simultaneous multithreading processors*. SIGARCH Comput. Archit. News, 29(2):40-51, 2001). Prefetching has also been used to hide the latency of a local filesystem (See, e.g., D. Kotz and C. S. Ellis. *Practical prefetching techniques for parallel file systems*. In PDIS, 1991; F. Chang and G. A. Gibson. *Automatic I/O hint generation through speculative execution*. In OSDI, 1999]. The inventors have recognized, however, that prefetching is not used for hiding the latency of remote data accesses, including network and remote data storage latencies.

Most prefetchers are history-based: they analyze data access patterns performed in the past, predict future data accesses to follow similar patterns, and prefetch the corresponding data. While this approach works for programs with regular data access patterns, such as array-based scientific programs, it is not effective for programs whose data accesses depend on the input, are not structured in easily predicted patterns, or do not contain recurrences (that is, frequent reuse of the same remote data).

While using speculative execution allows programs to dynamically discover future read accesses to disk, in the presence of dependencies between accesses, such approach often causes misspeculation of future disk accesses, and spurious disk accesses. Speculative parallelization schemes offer hope for solving the problem of excessive misspeculation, however, they have some disadvantages in the setting of remote data accesses. In particular, violation of dependencies that do not contribute to generating remote data requests may cause re-execution, thus re-executing some expensive remote access and hindering progress towards exposing other remote requests.

BRIEF SUMMARY

A method for speculative prefetching of remote data, in one aspect, may comprise, receiving a program to execute on a processor. The method may also comprise generating a prefetcher specific to the program that preserves the program's behavior. The method may further comprise executing the program. The method may yet further comprise concurrently executing the prefetcher with the program, including automatically identifying at runtime one or more remote data accesses that are independent and deciding when to start and stop speculative prefetching, the one or more remote data accesses being independent if value returned from the one or more remote data accesses is not computed from another value returned from another remote data access appearing logically earlier in the program. The method may also comprise storing, locally in a shared data structure shared by the program and the prefetcher, returned data from a data source as a result of issuing said one or more remote data accesses.

A system for speculative prefetching of remote data, in one aspect, may comprise a profiler module operable to execute on a processor, and further operable to identify potentially-independent remote data accesses in a program, a remote data access being independent if value returned from said remote data access is not computed from another value returned from another remote data access appearing logically earlier in the program. The system may also comprise a program rewriter operable to generate a program-specific prefetcher that preserves the behavior of the program, based on profiling information including the potentially-independent remote data accesses identified by the profiler. The system may further comprise an execution engine operable to execute said prefetcher and the program concurrently, the execution engine further operable to automatically decide which of said potentially-independent remote data accesses should be executed in parallel speculatively. The system may also comprise a shared memory shared by the program and the prefetcher, operable to store returned data from a data source as a result of issuing one or more of said remote data accesses.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
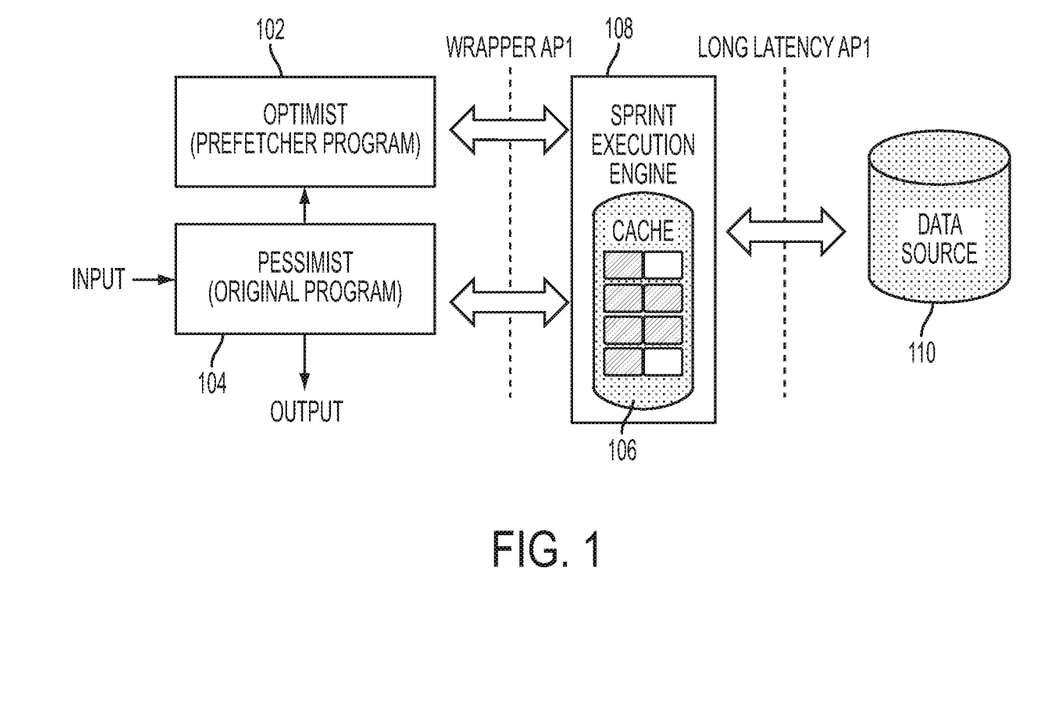
FIG. 1 is an architectural diagram illustrating workings of the present disclosure in one embodiment.

A methodology is disclosed in one embodiment that separates the concerns of exposing potentially-independent remote data accesses from the mechanism by which the overall completion time of the data accesses is reduced. To expose remote data requests, an approach of the present disclosure in one embodiment utilizes a prefetcher, automatically constructed from the original program. To schedule these requests efficiently, the methodology of the present disclosure in one embodiment utilizes an execution engine. FIG. 1 is an architectural diagram illustrating workings of the present disclosure in one embodiment. A prefetcher 102 in one embodiment may be a copy of the original program 104, which executes concurrently with the original program 104. The prefetcher 102 and the original program 104 issue remote data requests and cache the returned data locally in a shared data-structure 106. The prefetcher 102 in one embodiment may be executed by multiple threads in a speculatively-parallel manner whenever resources are available, and therefore, the prefetcher 102 executes faster than the original program 104. In this way, the original program 104 may find that the data it requires is already available in the cache.

Speculative execution refers to executing instructions of code in a path of a program before the execution actually reaches that stage, after guessing (speculating) that the program would take that path, e.g., executing instructions before it is known that they will be needed.

By restricting the effects of the prefetcher 102 to the cache 106, the behavior of the original program 104 is preserved. By constructing the prefetcher 102 from the original program 104, all dependencies are respected unless an explicit decision to speculate is made. The prefetcher 102 in one embodiment of the present disclosure is designed to respect dependencies between remote data accesses, but may violate other dependencies to expose potentially independent data accesses. This approach works well even for programs with irregular and input-dependent data accesses.

An execution engine 108 manages the cache 106 and automatically decides when to batch up accesses and when to issue them in parallel. Additionally, the execution engine 108 may be responsible for monitoring the effectiveness of the speculative prefetching by the prefetcher 102 and restarting the prefetcher 102 if the speculation goes astray (e.g., because some remote data accesses were incorrectly dubbed as independent). In one aspect, the prefetcher 102 interacts with the original program 104 only via the cache 106, managed by the execution engine 108, which executes remote data accesses in parallel or in a batch. Monitoring cache misses in the execution of the original program 104 provides a low-overhead way to identify violations of dependencies between remote data accesses.

If the remote data source 110 may be modified by other entities (not the program executed using the methodology of the present disclosure), then the execution engine 108 keeps the cache 106 in sync with the data source 110 using the mechanism of triggers and callbacks. Briefly, in database systems, "trigger" method is automatically executed in response to an event occurring on a selected table or view in a database. This method may be used to keep information in database synchronized. For example, when a new record is added to one table in database, new records corresponding to the added record also should be created in related tables. A "callback" is a reference to executable code, or a piece of executable code, that is passed as an argument to other code. If this mechanism is not supported by the API of the remote data source (e.g., databases usually support it, but remote services do not), then the programmer may be responsible for guaranteeing that the program does not rely on any data consistency constraints to be maintained by the remote data source 110.

The methodology of the present disclosure in one embodiment may reduce the burden on the programmer by helping to avoid code rewriting that might obstruct the functional logic of the program and result in nonportable performance gains. In one embodiment, the methodology of the present disclosure provides a practical system that can automatically perform speculative prefetching and optimization of remote data accesses, e.g., implemented using standard application programming interfaces (APIs), such as Java Database Connectivity (JDBC) and hypertext transfer protocol (HTTP). In one embodiment, the system may use profiling (e.g., on representative inputs supplied by the programmer) and runtime monitoring methods to automatically identify remote data accesses that are likely to be independent, and to decide when to start and stop speculative prefetching.

Figure 2:
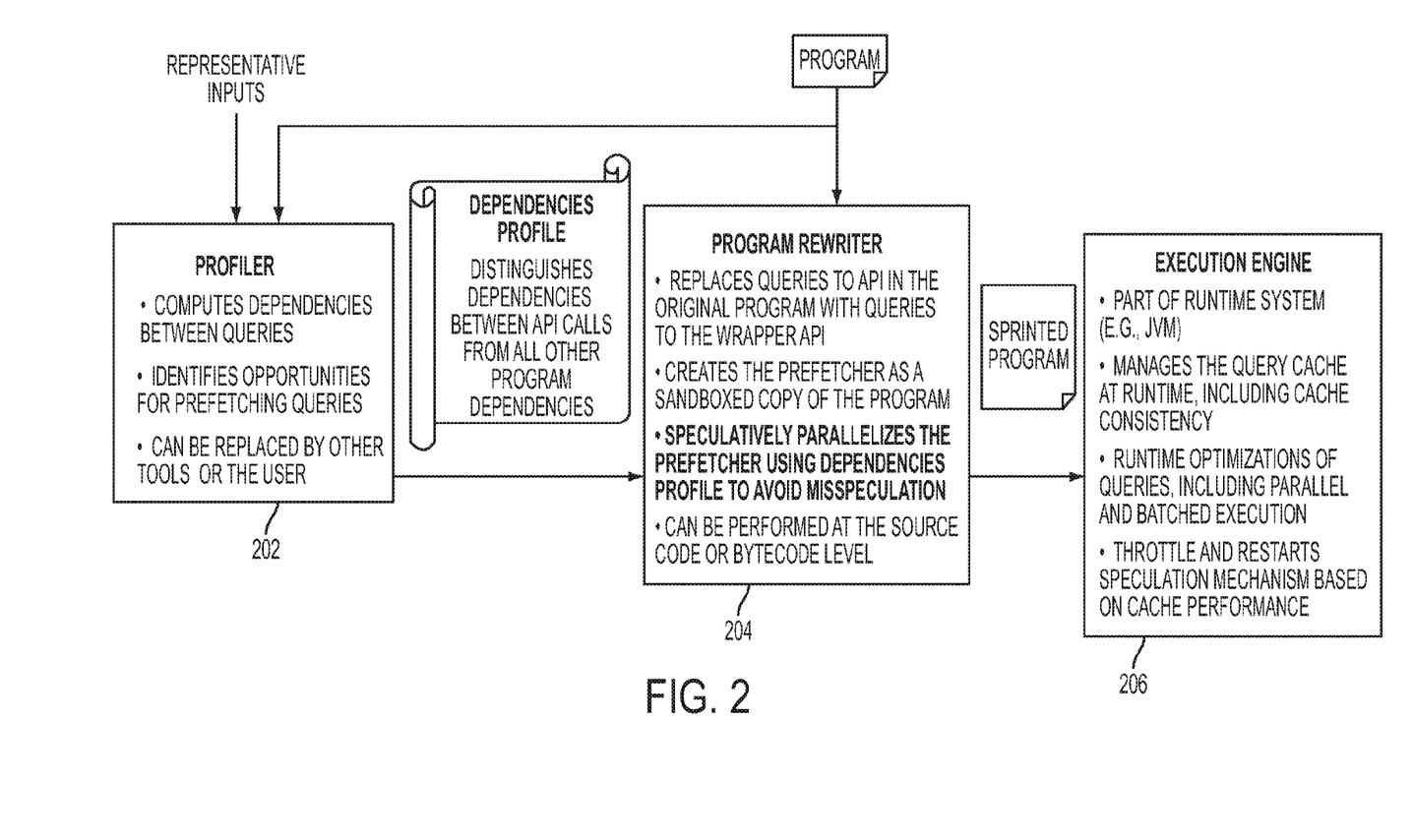
FIG. 2 is an overview of system architecture in one embodiment of the present disclosure.

In one embodiment of the present disclosure, an integrated tool or system may be provided that implements the methodology of the present disclosure. FIG. 2 is an overview of system architecture in one embodiment of the present disclosure. A profiler 202 may identify potentially-independent remote data accesses to improve accuracy of speculation. Independent remote data accesses refer to accessing data that is not dependent on other accesses to other data. As an example, accesses may be considered independent if they have independent keys (used to access, e.g., as described below with reference to FIG. 3). The profiler in one embodiment may look at a sequence of keys and determine if they are likely to be independent in that example. Other methods may be utilized to determine if accesses are independent. The prefetching mechanism should issue early requests for data that will actually be accessed by the program, but avoid issuing too many requests for remote data that is never used. While such spurious requests may not affect the program's behavior, they may have a negative impact on the performance of the environment (e.g., bandwidth to the remote data source and its responsiveness). Identifying potentially-independent remote data accesses improves such accuracy, for example, in predicting correctly what data will be accessed.

The profiler 202 computes dependencies between queries and identifies opportunities for prefetching queries. For instance, the profiler 202 may record the calling contexts leading to remote data access method invocations.

A program rewriter 204 (also referred to as a bytecode transformer) uses the profiling information 210, created by the profiler 202, to automatically generate a program-specific prefetcher 212 that preserves the behavior of the original program. The program rewriter 204, for example, replaces queries to API in the original program with queries to the wrapper API. For instance, the API methods for accessing remote data in the original program may be replaced by wrapper API calls. Briefly, a wrapper API goes around an API. An API usually has a call. A wrapper may perform an action before and/or after the call is executed. In this way, a new API may be created with an existing API.

The program rewriter 204 creates the prefetcher as a sandboxed copy of the program 208, and speculatively parallelizes the prefetcher 212 using dependencies profile 210 to avoid misspeculation. The functions of the program rewriter 204 may be performed at the source code level or bytecode level.

An execution engine 206 optimizes remote data accesses by executing them in parallel and in a batch, monitors the effectiveness of the prefetcher, and maintains correctness by keeping the local cache in sync with remote data source. Effectiveness may measure whether the overall latency to the latency of the longest remote data access dependency chain is reduced. For independent accesses, effectiveness also may determine whether the prefetching mechanism overlaps round trips to the remote data source by executing the requests in parallel or in a batch. Correctness may be measured to make sure that the prefetching has no side-effects on the program's behavior. In particular, if remote data may be modified by the program or by other entities, prefetching should guarantee that whenever the local version of the data is used by the program, this version is in sync with the remote one, or that the program correctness does not depend on it. The execution engine 206 may be a part of runtime system, e.g., Java™ virtual machine (JVM), and manage the query cache at runtime, including cache consistency. The execution engine performs runtime optimization of queries, including parallel and batched execution, and throttles and restarts speculation mechanism based on cache performance.

Consider the example code shown in Listing 1 (ignoring @Launch and @Speculate annotations on lines 16 and 26 for now). This program displays the management hierarchy rooted at the employee whose email address is the program input. In line 27, the method buildTree is called to fetch the corresponding hierarchy subtree from the remote data source into a local data-structure of Node objects.

The program uses a high-level API to access the remote data source. From the viewpoint of the program, the remote data source is just a mapping from keys to values. A remote data access is a lookup of the value stored in the remote data source for a given key. In this example, a key is the email address of an employee, and a value is the record of that employee, including the list of email addresses of employees who directly report to the employee.

In buildTree, the call to getEmployee in line 8 is expensive, because this method accesses the remote data source to fetch the details of the employee (implementation not shown). If the employee is not found, buildTree prints an error message and returns. Otherwise, buildTree constructs a node that will be the root of the subtree that corresponds to the employee (line 13), increments the count of nodes in the tree (line 14), and iterates over the direct reportees of the employee (line 15). Every iteration recursively builds the subtree that corresponds to the reportee (line 16) and updates the tree by linking the employee and the reportee nodes (line 18 and line 19).

Listing 1: Example of building a managerial tree

```
1 class Node {
2      static int numNodes = 0;
3      Node tree;
4
5      Node buildTree (String email) {
6           Employee emp;
7           try {
8                emp = getEmployee(email); // Expensive remote data
                 access
9           } catch (EmployeeNotInDatabaseException e) {
10               System.err.println('Employee ' + email + ' not found!');
11               return null;
12          }
13          Node root = new Node(emp);
14          numNodes++;
15          for (String reportee email : root.getReporteesEmail( )) {
16               Node child = @Speculate buildTree(reportee email);
17               if (child != null) {
18                    root.add(child);
19                    child.setParent(root);
20               }
21          }
22          return root;
23     }
24
25     void main(String[ ] args) {
26          @Launch Optimist(buildTree);
27          tree = new Node( ).buildTree(args[1]);
28          display(tree);
29     }
30 }
```

Figure 3:
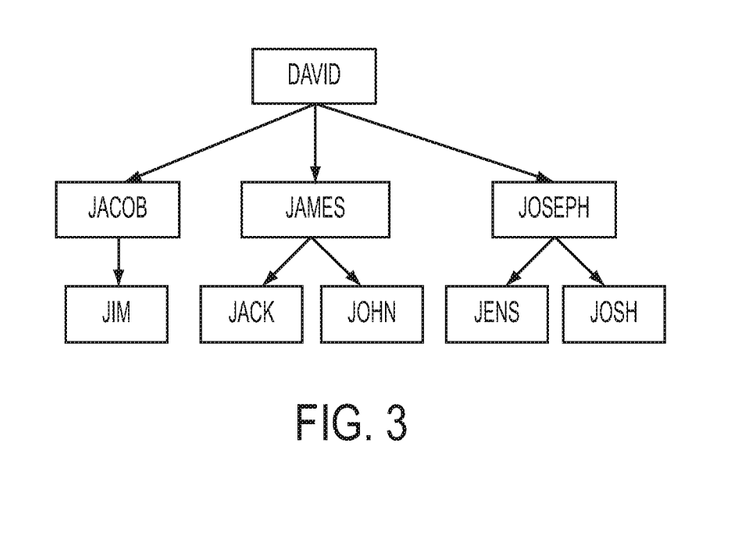
FIG. 3 shows the hierarchy computed by a sample execution of a program accessing remote data.

FIG. 3 shows the hierarchy computed by a sample execution of this program. In this execution, the program performed a sequence of 9 remote data accesses, which corresponds to the depth-first traversal of the tree shown in FIG. 3. The total execution time of this program is dominated by the latency of the remote data accesses. The methodology of the present disclosure in one embodiment may reduce the total execution time by overlapping the round trip times of remote data accesses whenever possible, without requiring the programmer to modify code. Existing APIs support parallel and batch access to remote data sources and thus provide a way to overlap round trips. The methodology of the present disclosure may identify as early as possible which remote data is accessed by the program, in the presence of dependencies between remote data accesses.

A remote data access t1 depends on remote data access t2 if the key used by t1 is computed from the value returned by t2. For example, the remote access getEmployee(jacob) depends on getEmployee(david), because the key jacob is computed using the value returned by getEmployee(david). It is easy to see that the dependencies in this example are structured as a tree that mimics the hierarchy shown in FIG. 3. The longest dependence chain between remote accesses is of length 3, indicating a potential for improvement upon the sequential execution. FIG. 3 shows dependencies between remote data accesses performed during an execution of the example program shown in Listing 1. Assuming sufficient resources, the methodology of the present disclosure can reduce the execution latency to the dependence height of the dependence chain of remote data accesses multiplied by a round trip latency.

Note that there are no dependencies between remote data accesses in different iterations of the loop in line 15, but there are memory dependencies between the iterations of this loop, due to updates of numNodes in line 14 and the Node data-structure in line 18. In other words, there are two kinds of dependencies—those that are required to determine the key for the next remote data access, and those that are not.

Existing methods are ineffective in this setting, because they do not distinguish between these two kinds of dependencies. For example, parallelization of the loop in line 15 using a known method would end up executing all remote data accesses sequentially, because the known method respects all dependencies, including memory dependencies in lines 14 and 18. The speculative execution method proposed by other known methods would speculate the return value of the first call to getEmployee in line 8, leading to misspeculation of the subsequent remote data accesses that depend on this value. Other methods (e.g., transactional memory with abstract locking, Galois, batching) would require the programmer to modify the code or to specify which dependencies are safe to ignore.

The tool that implements the methodology of the present disclosure may be implemented in a platform-independent manner. The tool may automatically transform a program with multiple remote data accesses into a well-performing program that combines the benefits of parallel and batch execution of remote requests.

A system may have a program that interacts with a remote data source through a "well-defined" API (the notion of "well-defined" is explained later). FIG. 1 shows changes to this system that a methodology of the present disclosure may make. A bytecode transformer of the present disclosure (e.g., shown in FIG. 2 as 204) makes two versions of the original program, the Optimist (O) 102 and the Pessimist (P) 104. P 104 is nearly identical to the original program, except that at a certain point in its execution, it spawns O 102 and communicates all live-in values for O's execution (indicated by the arrow from Pessimist 104 to Optimist 102 in FIG. 1). The idea is for O 102 to serve as a prefetcher for P 104 and to issue remote data accesses as early as possible. Thus, O 102 runs faster and stays ahead of P 104. For this, the methodology (or tool) of the present disclosure in one embodiment creates O 102 by speculatively parallelizing one or more loops or recursive methods in the original program 104. Listing 1 above shows annotation at the program points where O 102 is launched (line 26) and O 102 will be speculatively parallelized (line 16).

In one embodiment of the present disclosure, O 102 and P 104 communicate via a data cache 106 (e.g., inside the execution engine 108) that contains key-value pairs. The key corresponds to the uniform resource locator (URL) of some remote data, and the value corresponds to the remote data. By virtue of O's run-ahead execution, P 104 is likely to find that the remote data is available locally. Speculative stores to memory (other than the cache) by O 102 are dynamically privatized at run-time by the methodology of the present disclosure, thus ensuring the correctness of P's execution.

Figure 4:
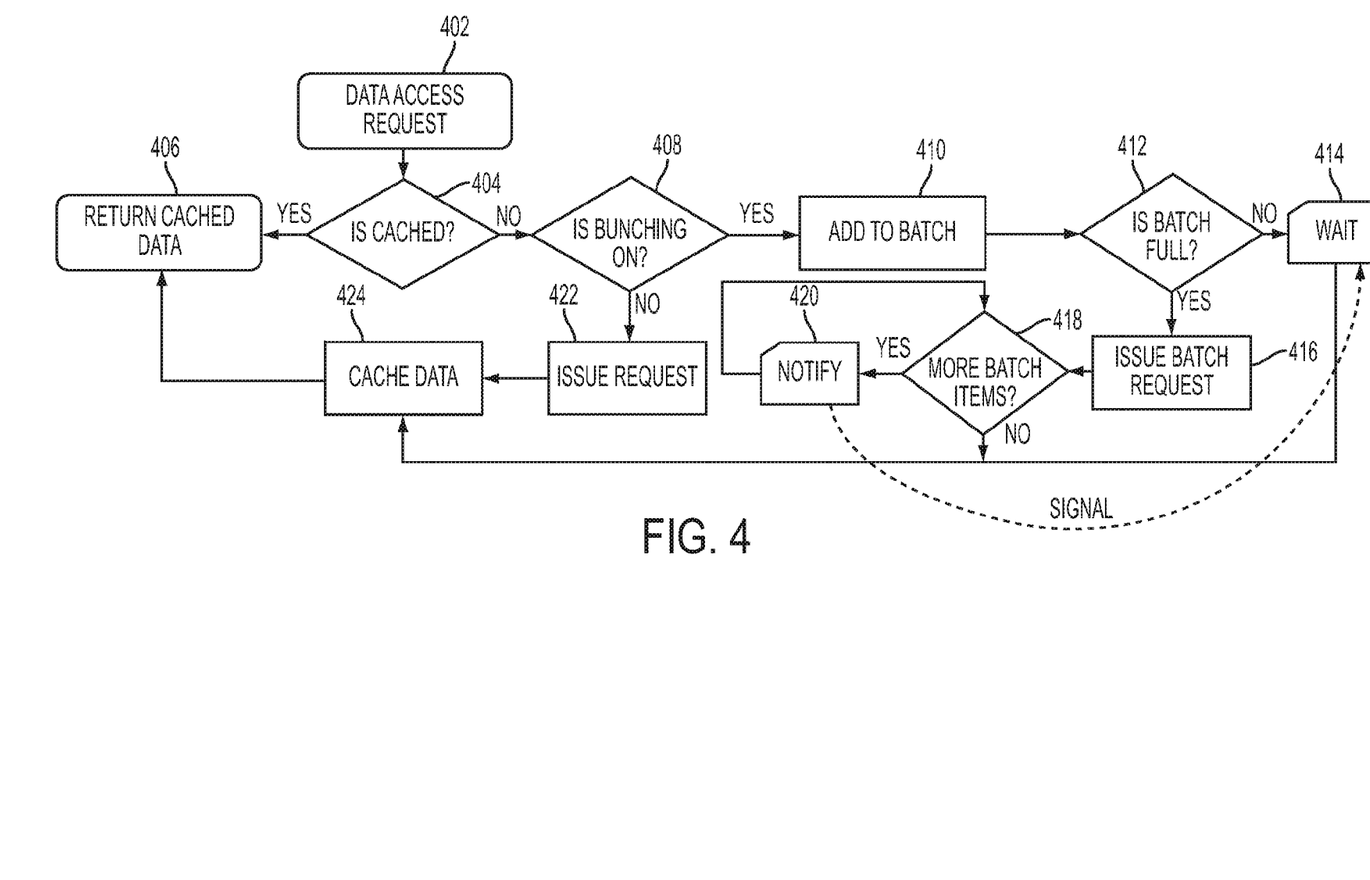
FIG. 4 illustrates data request processing algorithm in one embodiment of the present disclosure.

To execute multiple data accesses efficiently, the execution engine 108 of the present disclosure in one embodiment uses the logic shown in FIG. 4. It dispatches data accesses in parallel, or batches together some of the accesses, in case the remote data source supports batch execution. For parallelized execution of O, a tool of the present disclosure may include an intelligent thread pool and task queue, explained below. For processing data accesses and maintaining data consistency, the tool of the present disclosure may have an adaptive data cache, explained below.

In the expected case, O's data is available to P 104 ahead of time through the data cache 106. The executions of O 102 and P 104 are overlapped in a pipelined fashion, and the overall speedup in program execution time may be fundamentally limited only by the larger of (i) length of the dependence chain of remote accesses multiplied by a round trip latency and (ii) the time to execute the original code when all required data is available locally. In FIG. 3, assuming sufficient resources, the overall execution latency of the program will be reduced from 9 round-trips to 3 round-trips to the remote data source. This is because O 102 would have executed the subtrees rooted at james and joseph while P 104 is executing the subtree rooted at jacob, thereby completely hiding the latency of six out of the nine remote data accesses.

Optimist Thread Pool and Task Queue

Figure 5:
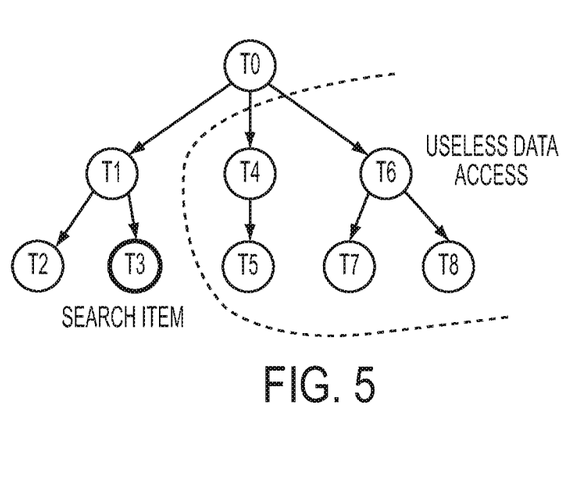
FIG. 5 shows a graph having example remote data access tasks in one embodiment of the present disclosure.

In one embodiment of the present disclosure, an Optimist 102 may be executed by multiple threads in a thread pool (initially containing just one thread) that has the following property: If there is no thread available to execute a task being enqueued, a new thread is created (without exceeding the maximum thread pool size that is specified). A task is a unit of parallel work. For example, buildTree on line 16 in Listing 1 is a task. In some applications, if all tasks in the task queue of the thread pool are treated equally, it might happen that O's threads spend most of their time executing data requests that are logically much later in the sequential execution. Consider the task (remote data access) graph shown in FIG. 5 that may be generated by a search over tree-structured data. If O's threads execute subtrees rooted at T4 and T6, P misses in the cache frequently since it is executing logically earlier data requests. And if P terminates early (while O did not because of misspeculation), a large fraction of the prefetches turns out to be useless. To increase the likelihood of O fetching at least those data items that will be used by P, the task queue is implemented as a priority queue that assigns higher priority to logically earlier tasks. For example, a task created on iteration 1 of a loop is assigned higher priority than a task created on iteration 2. In case tasks spawn more tasks in a nested fashion, a child task inherits the priority of the parent task, with the priorities of siblings being decided in the logical program order. Using the priority task queue, tasks in the subtree rooted at T1 will be executed before tasks in other subtrees, allowing T3 to be overlapped with T2. This results in a reduction in the total time to find the item. FIG. 5 shows a graph of program tasks. Depending on timing of task (unit of parallel work) execution, several useless data prefetches may be issued in place of useful ones. A priority task queue prioritizes tasks that come earlier in the original program order thereby improving the number of useful prefetches. Tasks are numbered according to their order in the original program.

Adaptive Data Cache

In one embodiment of the present disclosure, the data cache (e.g., FIG. 1 106) is the sole means of communication between O and P. Remote data accesses by both O (e.g., FIG. 1 102) and P (e.g., FIG. 1 104) are recorded in the data cache. An entry in the cache is a pair of key and value. The key corresponds to the URL of some remote data. The value corresponds to the remote data that is fetched from the URL. The value may have metadata that indicates its state: absent, issued, or present. Upon a cache lookup, if the state is absent, then a remote data access is issued. If the state is issued, the callee is blocked until the data is returned by the remote data source. If the state is present, data is returned from the cache. Both O and P may interact with the cache in an identical fashion. Consequently, either can fetch data for the other. In the uncommon case that O falls behind P, the data fetched by P serves to accelerate O.

Batch Execution: The execution engine (e.g., 108 in FIG. 1) may be also responsible for batching remote data accesses in one embodiment of the present disclosure. Since there are many threads executing different parts of the program (in both O and P), many entries may be created in the cache for different remote data accesses. Adding another state called batched to the metadata of value allows to aggregate all queries in the cache in the batched state, issue them all at once, and return the values appropriately thereby releasing the callees that were blocked. This capability of the execution engine batching of queries frees the programmer from the onerous task of identifying queries to batch and writing code to match the return values of each query with the appropriate place in the original program. FIG. 4 describes the steps in the processing of a data request.

In FIG. 4, a data access request is serviced by the cache if data has been prefetched. Otherwise, a data request is issued if batch size equals one, else the request is queued up in a batch and the requesting thread waits. When the batch becomes full, a batch request is issued; when it returns, waiting threads are notified and data is cached. At 402, data access request is received. The data access request may be from an executing prefetcher or the original program. At 404, the shared memory (cache memory) is searched or looked up to determined if the data requested is already in cache memory. If yes, at 406, the data is retrieved from the shared memory and returned to the requesting process or thread. If no, at 408, it is determined whether bunching flag is turned on. If bunching flag is on, the request is added to a batch of requests at 410. Otherwise, at 422, the request is issued to the data source. The returned data is then stored or cached in the shared memory at 424. At 412, it is determined whether the batch is full. If so, at 416, the requests in the batch are issued iteratively as shown at 418 and 420. If all requests in the batch are issued, the returned data is cached at 424. If at 412, the batch is not full, the thread waits at 414 for the batch to be full and its request to be issued. Once the request is issued, the waiting threads are notified or signaled (shown by the dotted line).

Prefetch Throttling: O (e.g., 102 in FIG. 1) executes the program speculatively and may go down execution paths that differ from the original program's execution, and/or prefetch from remote data that is never used. This may have negative effects such as contention for bandwidth to the remote data source between P, O, and other entities that access the remote data source. To minimize such effects, the execution engine (e.g., 108 in FIG. 1) can throttle the speculation by using information available in the data cache as a proxy for the degree of misspeculation. Specifically, if the number of cache misses by P (data or items not fetched by O) exceeds a threshold, then the prefetcher is deemed to be unhelpful, and can be shut down.

Correctness in the present disclosure in one embodiment refers to a program executing correctly, i.e., the original program's behavior or function is not affected. The methodology of the present disclosure in one embodiment improves the performance of the original program, but does not affect the behavior or intended functions of the original program. For instance, a bytecode transformer (or program rewriter) of the present disclosure may ensure that there is no interference of the Optimist and the Pessimist through client program memory and that the side effects of the Pessimist such as exceptions or output are not visible to the external world. The execution engine of the present disclosure in one embodiment may ensure the consistency of the cache with respect to the remote data source by invalidating the appropriate cache entries when the remote data source is modified.

In one embodiment of the present disclosure, the following one or more mechanisms may be implemented to provide correctness.

Interference Through Memory: The Optimist and Pessimist execute in the same process, hence the same virtual memory space. The transformation of the original program O into a prefetcher P, may ensure that O's actions cannot affect P's memory state, except via the cache. For instance, P interacts solely with objects created by itself, and O only updates the objects that it (O) creates, but may also read objects created by P (indicated by arrow from P to O in FIG. 1).

Externally-visible Behavior: The transformed program generates the same sequence of externally-visible behavior as the original program would have generated. The program rewriter (e.g., bytecode transformer) may ensure this by eliding all side effecting operations O. In practice, this may mean catching all exceptions, removing statements such as System.out.print, and API operations that may modify the remote data source. A "well-defined" API allows to identify such API operations. For every method whose execution has any observable effects on the remote data, the methodology of the present disclosure in one embodiment knows what are the keys corresponding to the modified values.

Consistency between Cache and Remote Data Source: In the present disclosure in one embodiment, the transformed program (e.g., 102 in FIG. 1) may maintain the consistency between the cache and the program and data source. If the remote data source is immutable, there are no inconsistency issues. Briefly, data is immutable if that data is not being modified as it is being fetched. Suppose that the original program performs some API operations that may modify the remote data, but there are no other entities that may modify the remote data. When this program executes under the methodology of the present disclosure, the only entity that may write to the remote data source is P, because the write operations in O are elided. When P issues a write operation on the remote data source, the execution engine (e.g., 108 in FIG. 1) of the present disclosure may invalidate the cache entry for the corresponding key.

Also, suppose that a program that uses the remote data source is executing with the methodology of the present disclosure, while the data source may be concurrently modified by other entities. In this situation, a reordering of reads in O's execution might observe an inconsistent state of the remote data and violate some invariant in P's execution. Suppose that the invariant of P relies on some integrity property of the remote data, and that this integrity property is (atomically) guaranteed by all other entities that may modify the remote data source. Consider an execution in which the remote data is modified by another entity between two out-of-order reads performed by O. It is possible that O observes a state of remote data that does not satisfy the integrity property, and is not observable in any execution of the original program.

For example, consider a data source M with initial state M={a|→1, b|→2}. The data integrity that is to be maintained by all entities that interact with the remote data source is M[b]>M[a]. This is a typical invariant, for example b could be a summary of elements such as a. The following two programs execute concurrently using M:

P1 ( ) { x = read (a, M); y = read (b, M); assert (y > x); }
P2 ( ) { atomic { x = read (a, M); y = read (b, M); write (a, x++, M), write(b, y++, M) } }

In a concurrent execution of P1 and P2, the set of all possible key-value sequences that can be generated by P1 is: $S_1$={(r[a, 1], r[b, 2]), (r[a, 1], r[b, 3]), (r[a, 2], r[b, 3])}

Note that the assertion holds in P1 in all three cases. Suppose that P1 is transformed and executed by the methodology of the present disclosure while P2 also executes concurrently using M. If the reads in the Optimist of P1 execute in parallel and happen to be served out of order by the data source, the following sequence of events may occur at the data source:

| | |
|---|---|
| read(b) | // by Optimist of P1 |
| write(a,2), write(b,3) | // by P2 |
| read(a) | // by Optimist of P1 |
| read(a), read(b) | // by Pessimist of P1 |

The following key-value sequence is generated by the Optimist of P1 in this execution: S'=(r[a, 2], r[b, 2]). In this result, the data source invariant has been violated. For the remote data source that supports "trigger" capabilities, this consistency problem may be solved by installing callbacks in the data source for the operations that update the data source.

Enforcing Consistency via Triggers and Callbacks: During the execution of a program under the methodology of the present disclosure in one embodiment, whenever the execution engine performs a remote data access with some key (a selected key), the execution engine may install a callback in the remote data source that states "notify me when the value that corresponds to this key is updated". Any write operation will cause the callback to be triggered and the remote data source will notify the execution engine executing the program. Upon receiving notification, the execution engine may invalidate the appropriate entry in the cache.

For instance, in the above example, a write operation performed by P2 to b will cause the callback to be triggered and the remote data source will notify the engine executing P1.

In the example above, with the operation read(b) performed by the Optimist of P1, the execution engine may install a callback on key b. The operation write(b,3) performed by P2 triggers the callback on the key b. The execution engine then may invalidate the entry for b in the cache. Consequently, read(b) by the Pessimist of P1 will miss in the cache, and the request will be reissued. The sequence of key-value pairs observed by the Pessimist of P1 is ([a, 2], [b, 3]) and the assertion in P1 holds.

Data sources such as the MySQL database provide triggers with the above semantics that could be leveraged by the methodology of the present disclosure in one embodiment. In the absence of trigger APIs, the methodology of the present disclosure may ask the programmer whether the consistency semantics arising from the reordering of reads are acceptable.

The following describes example implementation details in one embodiment for a profiler (e.g., FIG. 2 202) of the present disclosure that determines candidate methods to optimize, an example of a program rewriter (e.g., FIG. 2, 204, e.g., bytecode transformer) that transforms the program at run-time based on the profiling results, and an interface that a programmer can implement to use the methodology of the present disclosure for optimizing programs that interact with data sources other than those that are currently supported.

Profiler

The methodology of the present disclosure may use profiling to determine suitable program sites to launch the Optimist (see e.g., Listing 1, line 26) and the program sites at which to speculate (see e.g., Listing 1, line 16). Without any modifications, the user executes the program of interest (original program) on a representative input with the profiler (e.g., FIG. 2, 202) turned on. The profiler may record the calling contexts leading to remote data access method invocations (such as the JDBC execute statement for executing SQL queries). The profiler also may record whether the loop (or recursive method) transitively invokes remote data access methods. Such loops (or recursive methods) are marked as "candidates". There may be two modes of operation: Interactive— the user can specify candidates; and Automatic—the profiler directly feeds candidate information to the bytecode rewriter.

In the interactive mode, the user is presented with a list of candidates. The user puts the @Speculate annotation inside a candidate that is expected to not have dependencies between remote data accesses emanating from it (e.g., Listing 1, line 16). If the user annotates incorrectly (e.g., there are dependencies between data accesses at run-time), the methodology of the present disclosure may ensure correct program execution, for instance, as described above.

In the fully automatic mode, the methodology of the present disclosure in one embodiment can infer the @Speculate annotation in different ways. For instance, the methodology of the present disclosure in one embodiment may use a dynamic dataflow tracking tool (e.g., Pepe) that tracks the flow of data through the remote data access methods to build a remote data access dependency graph. The dependency information is maintained in the context of the candidates. Referring to the candidate loop between lines 15-21 in Listing 1, the profiler may record the number of dependencies between remote data accesses that are carried around the loop's back-edge. The frequency of dependencies is used to determine the profitability of transforming the loop. Pepe works for JDBC method invocations. To transform programs that interact with other data sources, the methodology of the present disclosure in one embodiment may transform each and every candidate (independently) and then observe the cache statistics on training runs to determine whether it is worthwhile to transform a candidate. Candidates with high cache hit rates would be transformed while candidates with high miss rates may be ignored.

Program or Bytecode Rewriter

The following describes examples of the code modifications for initiating O in P, constructing O, and preserving the semantics of the original program. As an example, a program rewriter of the present disclosure may use the ASM class transformation library to augment the classes that are loaded at run-time. The program rewriter may be written entirely in Java, with no modifications to the underlying virtual machine. In the following example, the code modifications are shown in the form of high level Java™ statements for ease of understanding; in practice, the changes are done to Java™ bytecode.

Initiating the Optimist

P is modified to initiate O upon every invocation of the immediate predecessor method of the method containing the candidate loop or recursive method. Referring to Listing 1, the immediate predecessor of buildTree is main. Listing 1 shows the change to main. O may be executed by a thread pool, and initiating O means submitting a task for execution by the thread pool. Listing 2 below shows an example code for initiating the Optimist.

Listing 2

```
class Node{
2     static int numNodes = 0;
3     Node tree;
4
5     Node buildTree (String email) {
6         Employee emp;
7         ...
8         for (String reportee email : root.getReporteesEmail( )) {
9             Node child = @Speculate buildTree(reportee email);
10            ...
11        }
12        return root;
13    }
14
15    void main(String[ ] args) {
```

Listing 2

```
16          try{
17              Pessimist.execute(buildTree(args[1]));
18          } catch (Exception e){ }
19          tree = new Node( ).buildTree(args[1]);
20          display(tree);
21      }
22 }
```

Constructing the Optimist

O may be constructed out of the original program. In one embodiment of the present disclosure, two code transformations may be performed to address the issues of interference of O and P through client program memory, and sequence of side effects that are visible to the external world. A general approach creates two versions of every method in a class, one for use by O and the other by P. The design choice of method duplication may be motivated by a space-time tradeoff, namely that it allows P to be almost as fast as the original sequential program because P's code remains nearly identical to the original program, at the cost of having multiple copies of each method. In one aspect, P may acts very closely to the original program, with exceptions; e.g., while the original program fetched from a remote site, P first looks to its cache to fetch, and if the item being fetched is not found in the cache, P does not go to the remote site. P also may perform throttling and communications with O.

Memory Protection (MP) Transformation: All writes to class members may protected by guards in the O version of each method. The details of the MP transformation vary depending on whether the type is an array. Non-array types are discussed first. Listing 3 shows the Node class from earlier listings after the MP transformation. A new field createdByOptimist (line 4) is added to the class to indicate whether the current instance was allocated by O. This field is set during object allocation (lines 7-8). All writes by O to the instance fields of a class may be guarded by ownership checks (for example, the write of tree by O in main Optimistic on lines 42-44). O is allowed to write only if the method is invoked on a class instance allocated by O (createdByOptimist is true).

Listing 3 below shows protecting shared memory.

Listing 3

```
1 class Node{
2       static int numNodes = 0;
3       Node tree;
4       private boolean createdByOptimist;
5
6       Node( ) {
7           if (Thread.group.equals(SPRINT TGRP))
8               createdByOptimist = true;
9       }
10
11      Node buildTree (String email) {
12          if (Thread.group.equals(SPRINT TGRP))
13              return main Optimistic(args);
14          ...
15      }
16      Node buildTree Optimistic (String email) {
17          Employee emp;
18          try {
19              emp = getEmployee(email); // Expensive remote data access
20          } catch (EmployeeNotInDatabaseException e) {
21              System.err.println('Employee ' + email + ' not found!');
22              return null;
```

Listing 3

```
23          }
24          Node root = new Node(emp);
25
26          for (String reportee email : root.getReporteesEmail( )) {
27              Node child = buildTree(reportee email);
28              if (child != null) {
29                  root.add(child);
30                  child.setParent(root);
31              }
32          }
33          return root;
34      }
35
36      void main(String[ ] args) {
37          if (Thread.group.equals(SPRINT TGRP))
38              return main Optimistic(args);
39          ...
40      }
41      void main Optimistic(String[ ] args) {
42          Node temp = new Node( ).buildTree(args[1]);
43          if (createdByOptimist)
44              tree = temp;
45          display(tree);
46      }
47 }
```

In one embodiment, the methodology of the present disclosure may use a different strategy for array elements since the array type cannot be extended to incorporate ownership information. For each array allocated by the original program, the methodology of the present disclosure in one embodiment may allocate a variable that maintains ownership metadata that is updated at the time of array creation. the methodology of the present disclosure in one embodiment may maintain a map from array to ownership metadata. This map is used to lookup ownership information when an array is being updated. the methodology of the present disclosure in one embodiment may use an optimized multi-level lookup table to reduce the overhead of this operation.

Side Effect Protection (SEP) Transformation

To prevent O from performing operations that result in externally-visible side effects, all such operations may be elided from the O version of each method (Listing 3, line 21). The methodology of the present disclosure in one embodiment may maintain a database of methods to be elided. Another component of side effect protection may be exception trapping. Exceptions may be thrown during the course of O's execution that may not have occurred during the execution of the original program. To ensure that such exceptions do not escape to the user, the prefetch initiation method invocation is wrapped in a try-catch block (see e.g., Listing 2, lines 16-Wrapping may be performed also at finer granularities in the control flow graph in order to allow O to make useful progress beyond local exceptions.

Optimizing the Optimist

For O to execute faster than P, the methodology of the present disclosure in one embodiment may spawn multiple invocations of an annotation site optimistically in parallel (See e.g., Listing 4, lines 25-26).

Listing 4 below illustrates optimizing the prefetcher.

Listing 4

```
1 class Node {
2       static int numNodes = 0;
3       Node tree;
4       private boolean createdByOptimist;
```

-continued

Listing 4

```
 5
 6    Node( ) {
 7        if (Thread.group.equals(SPRINT TGRP))
 8            createdByOptimist = true;
 9    }
10
11    Node buildTree (String email) {
12        if (Thread.group.equals(SPRINT TGRP))
13            return main Optimistic(args);
14        ...
15    }
16    Node buildTree Optimistic (String email) {
17        Employee emp;
18        try {
19            emp = getEmployee(email); // Expensive remote data access
20        } catch (EmployeeNotInDatabaseException e) {
21            return null;
22        }
23        Node root = new Node(emp);
24        for (String reportee email : root.getReporteesEmail( )) {
25            Node child = executor.submit(
26                new Task(buildTree, reportee email));
27            if (child != null) {
28                root.add(child);
29                child.setParent(root);
30            }
31        }
32        return root;
33    }
34
35    void main(String[ ] args) {
36        if (Thread.group.equals(SPRINT TGRP))
37            return main Optimistic(args);
38        ...
39    }
40    void main Optimistic(String[ ] args) {
41        Node temp = new Node( ).buildTree(args[1]);
42        if (createdByOptimist)
43            tree = temp;
44        display(tree);
45    }
46 }
```

Details of executor (thread pool) creation are left out with the note that it happens when the Java™ agent is loaded. The thread executing the continuation of the spawned future does not block on the future returned by the submit call (Listing 4, lines 25-26). Instead, the methodology of the present disclosure in one embodiment may speculate a return value. In one embodiment, the speculated values may be the equivalent of the null value for different types. In another embodiment, results of profiling or memorize values from prior invocations may be used as speculated values.

Listing 5 shows an example API implemented using the data request algorithm using the Cache and Batcher interfaces. The implementation is fully parameterized with respect to the key and value types in this example. Example APIs for accessing data sources may include but are not limited to Java Database Connectivity (JDBC) API and the Java URLConnection API. Other data sources may be supported in the present disclosure.

In one embodiment of the present disclosure, Batch interface may be implemented for supporting other data sources. Different data sources may differ in the types of queries that can be batched, the means to prepare a batch, and the means to execute a batch. A Batch interface may abstract these details away from the batching logic, allowing the programmer to just supply the data source specific batch creation and execution code. For example, a JDBCBatch implementation of the execute method of the Batch interface for a DB2 database may involve preparing a batch statement via conn.prepareStatement and executing the batch via stmt.executeDB2QueryBatch. The Batch interface is used internally by the data request processing algorithm.

Listing 5

```
 1 public interface Cache <K extends Object, V extends Object> {
 2     /**Return the cached value corresponding to the key*/
 3     V get(final K key);
 4     /**Insert a value to cache corresponding to key*/
 5     V put(final K key, final V value);
 6     /**Remove cached value corresponding to key*/
 7     void remove(final K key);
 8     /**Flush the cache*/
 9     void clear( );
10     /**If cached entry corresponding to key already exists, then
11      * return entry; else cache value*/
12     V putIfAbsent(K key, V value);
13 }
14
15 public interface Batcher<T extends Batchable<R>, R> {
16     /**Add offered element to batch*/
17     R add(T obj);
18 }
19
20 public interface Batch<T extends Batchable<R>, R> {
21     /**Execute batch*/
22     void execute( );
23     /**Return true if it was possible to add the offered element to the
batch, else false*/
24     boolean offer(T obj);
25     /**Return true if batch is full and is the first caller, else
26      * false. Must be invoked only after offer returns false.*/
27     boolean isFull( );
28     /**Return true if batch is currently executing*/
29     boolean isExecuting( );
30 }
```

The methodologies of the present disclosure may be implemented in Java™. Examples of programs (original programs) that can be run using the methodology of the present disclosure may include but are not limited to programs that access data sources such as Organization's Yellow Pages Web Service (YP), DB2 Database (DB2), Facebook Web Service (FB) and others. Those programs may utilize APIs such as Java URL Connection, Java Database Connectivity (JDBC), Facebook Graph API and others to interact with data sources. The network between the client machines that run the programs and data sources may be remote or local. Such networks include local area network (LAN) or wide area network (WAN) or others.

Batching optimization may be achieved, for instance, for data sources that support batching. Data requests could be accelerated beyond the number of simultaneous connections to the data source, while also enabling the data source's query optimizer to plan a better execution of the queries. For example, the large reduction in the number of round trips via batching may yield a huge benefit. Benchmarked evaluation in the case of Friend Connectivity application (Facebook™) shows that the batch size was arbitrarily set to 100. In addition, prioritized task execution may prioritize data requests that come earlier in the original program order thereby increasing the likelihood that useful data is prefetched.

In one embodiment, the ratio of remote data access latency and computation latency may drive the amount of performance improvement. For example, the higher the amount of time a program spends in remote data accesses compared to time spent in "computing the addresses of the accesses" and other operations, the more performance improvement in the program execution may be achieved. The length of remote data access dependency chains may also factor into how much performance improvement may be achieved. For instance, the longest dependency chain times the remote data access latency may be the lower bound on the time to execute the remote data accesses.

The methodology of the present disclosure may convert a number of remote accesses by the original program into local accesses to the cache in the modified program. The methodology of the present disclosure in one embodiment may generate Optimistic threads that are long running without store elisions thereby respecting most dependencies and avoiding resynchronization costs. In one embodiment, the methodology of the present disclosure may preserve the semantics of the original program, distinguish between dependencies that matter for identifying remote data accesses and those that matter for computation that uses the data returned by the remote accesses, thereby reducing misspeculation, reuse useful work done by speculative execution, and perform both batch execution and parallel execution of data requests. In another aspect, the methodology of the present disclosure in one embodiment may extend prefetching for irregular and input-dependent data access patterns. The techniques presented in the present disclosure may be applicable in other contexts such as prefetching from disk.

The methodology of the present disclosure is also described in Sprint: Speculative Prefetching of Remote Data, Arun Raman, Greta Yorsh, Martin Vechev, and Eran Yahav, Proceedings of the 26th Annual ACM SIGPLAN Conference on Object-Oriented Programming, Systems, Languages, and Applications (OOPSLA), Oct. 22-27, 2011, pages 259-274, which disclosure is incorporated herein by reference in its entirety.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for speculative prefetching of remote data, comprising:
  receiving a program to execute on a processor;
  generating a prefetcher specific to the program that preserves the program's behavior;
  executing the program;

concurrently executing the prefetcher with the program, including automatically identifying at runtime one or more remote data accesses that returned value not computed from another value returned from another remote data access appearing logically earlier in the program and deciding when to start and stop speculative prefetching; and storing, locally in a shared data structure shared by the program and the prefetcher, returned data from a data source as a result of issuing a remote request to said one or more remote data accesses, wherein executions of the program and the prefetcher are overlapped in a pipelined fashion, wherein tasks of the prefetcher are executed by multiple threads in parallel, the tasks implemented in a task queue that assigns higher priority to logically earlier tasks.

2. The method of claim 1, further including said prefetcher automatically performing speculative prefetching.

3. The method of claim 1, wherein the step of concurrently executing further includes automatically determining which one or more remote data accesses should be batched, and which one or more remote data accesses should be parallelized.

4. The method of claim 1, further including monitoring the prefetcher's execution and determining whether said returned data is being used by the program.

5. The method of claim 1, further including maintaining the local shared data structure in synch with the remote data source.

6. The method of claim 5, wherein the local shared data structure is synchronized with the remote data source by utilizing a trigger and callback mechanisms.

7. The method of claim 1, wherein the step of concurrently executing further includes speculatively parallelizing execution of iterations in a loop that includes said one or more remote data accesses, wherein each iteration of said one or more remote data accesses is executed in parallel.

8. The method of claim 1, wherein the step of concurrently executing further includes batching a plurality of remote data accesses in the program.

9. The method of claim 1, wherein the shared data structure is a shared cache and the shared cache is the sole means of communication between the prefetcher and the program during runtime.

10. The method of claim 1, further including modifying the program to initiate the prefetcher upon invocation of an immediate predecessor method of a method containing said one or more remote data accesses.

11. A system for speculative prefetching of remote data, comprising:

a processor;

a profiler module operable to execute on the processor, and further operable to identify a remote data access that returned value not computed from another value returned from another remote data access appearing logically earlier in the program;

a program rewriter operable to generate a program-specific prefetcher that preserves the behavior of the program, based on profiling information including the remote data accesses identified by the profiler that returned value not computed from another value returned from another remote data access appearing logically earlier in the program;

an execution engine operable to execute said prefetcher and the program concurrently, the execution engine further operable to automatically decide which of said remote data accesses that returned value not computed from another value returned from another remote data access appearing logically earlier in the program should be executed in parallel speculatively; and a shared memory shared by the program and the prefetcher, operable to store returned data from a data source as a result of issuing a remote request to one or more of said remote data accesses, the profiler module further operable to automatically track a flow of data to build a remote data access dependency graph to automatically identify the remote data accesses that returned value not computed from another value returned from another remote data access appearing logically earlier in the program in the program.

12. The system of claim 11, wherein said prefetcher automatically performs speculative prefetching.

13. The system of claim 11, wherein the execution engine further automatically determines which one or more remote data accesses in the program should be invoked in batch mode.

14. The system of claim 11, wherein the execution engine further monitors the prefetcher's execution and determines whether said returned data is being used by the program.

15. The system of claim 11, wherein the execution engine further maintains the local shared data structure in synch with the remote data source.

16. The system of claim 15, wherein the local shared data structure is synchronized with the remote data source by the execution engine registering a trigger and callback mechanisms.

17. The system of claim 11, wherein the execution engine concurrently executes iterations in a loop that includes said remote data accesses.

18. The system of claim 11, wherein the shared data structure is the sole means of communication between the prefetcher and the program during runtime.

19. The system of claim 11, wherein the profiler further modifies the program to initiate the prefetcher upon invocation of an immediate predecessor method of a method containing said remote data accesses.

20. A non-transitory computer readable storage medium storing a program of instructions executable by a machine to perform a method of speculative prefetching of remote data, comprising:

receiving a program to execute on a processor;

generating a prefetcher specific to the program that preserves the program's behavior;

executing the program;

concurrently executing the prefetcher with the program, including automatically identifying at runtime one or more remote data accesses that returned value not computed from another value returned from another remote data access appearing logically earlier in the program and deciding when to start and stop speculative prefetching; and storing, locally in a shared data structure shared by the program and the prefetcher, returned data from a data source as a result of issuing a remote request to said one or more remote data accesses, wherein executions of the program and the prefetcher are overlapped in a pipelined fashion, wherein tasks of the prefetcher are executed by multiple threads in parallel, the tasks implemented in a task queue that assigns higher priority to logically earlier tasks.

21. The computer readable storage medium of claim 20, further including said prefetcher automatically performing speculative prefetching.

22. The computer readable storage medium of claim 20, wherein the step of concurrently executing further includes automatically determining which one or more remote data accesses should be batched, and which one or more remote data accesses should be parallelized.

23. The computer readable storage medium of claim 20, further including monitoring the prefetcher's execution and determining whether said returned data is being used by the program.

24. The computer readable storage medium of claim 20, further including maintaining the local shared data structure in synch with the remote data source.

25. The computer readable storage medium of claim 20, wherein the step of concurrently executing further includes speculatively parallelizing execution of iterations in a loop that includes said one or more remote data accesses, wherein each iteration of said one or more remote data accesses is executed in parallel.

* * * * *